(12) United States Patent
Viereck et al.

(10) Patent No.: US 7,833,312 B2
(45) Date of Patent: Nov. 16, 2010

(54) METHOD OF DRYING AN AIR DEHUMIDIFIER

(75) Inventors: Karsten Viereck, Regenstauf (DE); Reiner Brill, Nidda (DE); Kai Haemel, Jossgrund (DE); Alexander Lodig, Ober-Mörlen (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 266 days.

(21) Appl. No.: 12/096,837

(22) PCT Filed: Jan. 31, 2007

(86) PCT No.: PCT/EP2007/000803

§ 371 (c)(1),
(2), (4) Date: Jun. 10, 2008

(87) PCT Pub. No.: WO2007/098840

PCT Pub. Date: Sep. 7, 2007

(65) Prior Publication Data

US 2009/0000472 A1    Jan. 1, 2009

(30) Foreign Application Priority Data

Mar. 2, 2006  (DE) .................. 10 2006 009 668

(51) Int. Cl.
*B01D 53/96* (2006.01)
(52) U.S. Cl. .............. 95/14; 95/10; 95/18; 96/112; 96/420

(58) Field of Classification Search .............. 95/10, 95/14, 18; 96/112, 420
See application file for complete search history.

(56) References Cited

U.S. PATENT DOCUMENTS

| | | | | |
|---|---|---|---|---|
| 4,023,940 | A * | 5/1977 | Shultz | 96/112 |
| 4,135,101 | A * | 1/1979 | Young et al. | 307/39 |
| 4,171,624 | A * | 10/1979 | Meckler et al. | 62/271 |
| 6,709,496 | B2 * | 3/2004 | Viereck et al. | 96/111 |
| 2003/0089238 | A1 * | 5/2003 | Viereck et al. | 96/111 |
| 2003/0233941 | A1 * | 12/2003 | Battershell et al. | 96/112 |
| 2006/0086120 | A1 * | 4/2006 | Kashirajima et al. | 62/271 |
| 2007/0180844 | A1 * | 8/2007 | Fujiyoshi et al. | 62/271 |
| 2007/0199443 | A1 | 8/2007 | Viereck | 95/10 |

FOREIGN PATENT DOCUMENTS

| | | |
|---|---|---|
| DE | 18928 | 8/1957 |
| DE | 1063703 | 8/1959 |

\* cited by examiner

*Primary Examiner*—Robert J Hill, Jr.
*Assistant Examiner*—Christopher P Jones
(74) *Attorney, Agent, or Firm*—Andrew Wilford

(57) ABSTRACT

The invention relates to a method for controlling a heatable dehumidifier. The heating of the dehumidifier is to be actuated only when several congruent time windows within which a temperature gradient is greater than or equal to 0 could be determined during a certain period of time, i.e. the heating is to be actuated only when no air flows into the interior of the expansion vessel of the transformer.

6 Claims, 2 Drawing Sheets

METHOD OF DRYING AN AIR DEHUMIDIFIER

CROSS REFERENCE TO RELATED APPLICATIONS

This application is the US national phase of PCT application PCT/EP2007/000803, filed 31 Jan. 2007, published 7 Sep. 2007 as WO2007/098840, and claiming the priority of German patent application 102006009668.1 itself filed 2 Mar. 2006, whose entire disclosures are herewith incorporated by reference.

FIELD OF THE INVENTION

The invention relates to a method of drying an air dehumidifier filled with moisture-absorbing material for oil-insulated transformers, chokes, or tap changers.

BACKGROUND OF THE INVENTION

European Patent EP 1,313,112 [U.S. Pat. No. 6,709,496] discloses an air dehumidifier of the above-described type in which an electric heater is provided to heat up and thereby dry the regenerable absorption agent. It is possible in this way to redry the absorption agent when saturated and thereby to make it ready for further liquid uptake. The electric heater in this case is actuated by a moisture sensor mounted in the air dehumidifier when a threshold value is exceeded.

German Patent DE 103 57 085 [US 2007/0199443] further discloses a method of dehumidifying with a heatable air dehumidifier of this type. The electric heater for heating up and drying the regenerable granules is only actuated here when the moisture sensor signals that a moisture limit has been exceeded and also when there is no air flowing into the oil expansion tank. In other words in this method, actuation of the heater is permitted only when no air inflow is present or when air is escaping from the oil expansion tank, but never when air is entering the oil expansion tank.

These states are detected in the prior-art method by sensing air flow and optionally its flow direction or also by determining the pressure difference between the dehumidifier housing and the oil expansion tank. Air flow sensors or even relative pressure sensors are used for this purpose.

It has become evident in practice that air flow through the actual oil expansion tank is relatively low. A typical value in practice for power transformers is 2.5 l/min and for tap changers 0.5 l/min. With these low air throughputs, the air-flow sensors used have to be highly accurate; such sensors are costly.

OBJECT OF THE INVENTION

It is, accordingly, the object of the invention to provide a method of drying an air dehumidifier where sensors of this type can be eliminated and nevertheless it can be assured with simple technical means that heating up and the resultant drying of the absorption agent occur only when no air is entering the oil expansion tank.

SUMMARY OF THE INVENTION

This object is achieved by a method characterized by the steps of:

dividing a primary cycle into different time slots,
determining at the beginning of a first time and at a second time of each time slot in each case the temperature ($\theta_2 - \theta_1$) at the intake and calculating a temperature gradient ($d\theta/dt$) therefrom according to the relation $\theta_2 - \theta_1 = d\theta/dt$, subsequently repeating these temperature measurements and calculations of temperature gradients for identical time slots in x−1 successive primary cycles, storing for each of the primary cycles those time slots in which the temperature gradient is greater than or equal to 0, thereafter determining during another cycle x whether during each of the previous cycles there are at least z consecutive identical stored time slots during which the temperature gradient is greater than or equal to 0, and if this is the case, during cycle x at the beginning of the corresponding time slots of the previous cycles starting the electric heater, provided that at this time the temperature gradient is again greater than or equal to 0, or, if this is not the case, including another cycle x+1 in the comparison.

The method of attaining the object is based on the general inventive idea that a power transformer with an increasing load becomes warmer than its environment and, therefore, the outward flowing air from the transformer is warmer than the outside air. The method of the invention entails determining whether air flows or does not flow from the interior to the exterior by determining the temperature gradient, i.e. the temperature profile, of the measured air within the system. Only a single temperature sensor, which is expediently disposed in the intake of the expansion tank, is required to carry out the method. If the temperature gradient is positive, air is flowing out of the expansion tank; the transformer "breathes out." Heating can be performed in such a case, or, when the temperature gradient is 0, signifying that there is no airflow. Alternatively, when the temperature gradient is less than 0, air is flowing into the expansion tank; the transformer "breathes in." Heating must not be done under these conditions. The technical reasons for this are known and are explained in above-cited DE 103 57 085, to which reference is made here.

BRIEF DESCRIPTION OF THE DRAWING

The method of the invention is described in greater detail by way of example hereinafter with use of the figures. Therein.

SPECIFIC DESCRIPTION

Figure 1:
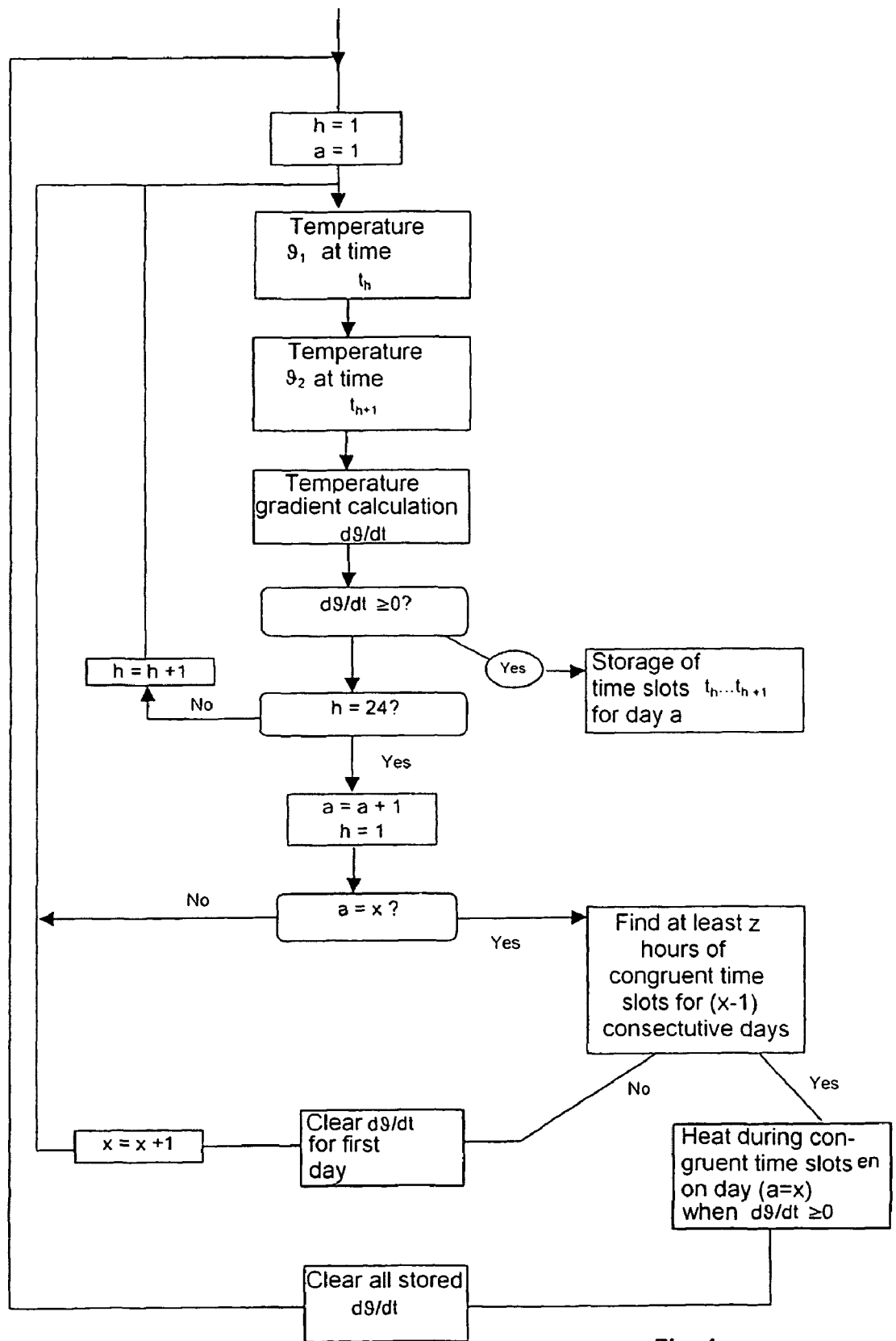
FIG. 1 shows the method of the invention in the time sequence of the process steps.

First as show in FIG. 1, the temperature $\theta_1$ at the intake to the expansion tank of the transformer or tap changer is determined and temporarily stored. In FIG. 1, this time of the temperature measurement is designated by $t_{he}$.

After a certain time, e.g. an hour, the temperature in the intake to the expansion tank is again determined. In FIG. 1, this temperature is designated as $\theta_2$, and the time with $t_{h+1}$.

Next, the temperature $\theta_1$ determined at the beginning of the hour is subtracted from the temperature $\theta_2$ determined at the end of the hour, and the result is stored as the temperature gradient $d\theta/dt$.

It is then determined whether $d\theta/dt$ is greater than or equal to 0. If this is the case, this means that it had become warmer in the intake over the course of the hour at whose start and end a measurement was made; the method of the invention, has therefore determined that warm air has flowed out and the transformer or tap changer has "breathed out." If the temperature gradient is equal to 0, this means that no air exchange has occurred. In both cases, heating of the absorbing material would be possible.

If the temperature gradient dθ/dt is greater than or equal to 0, this time slot $t_{h\ldots h+1}$ is stored. This temperature measurement and subsequent gradient formation are then repeated constantly for a first cycle. Here, the invention is illustrated using the example that in each case an entire day a is selected for this cycle. The temperature measurement and subsequent gradient calculation are then constantly repeated for each hour of the 24 hours of the first day a until all 24 hours have been covered. In the illustrated embodiment illustrated here, a time slot $t_{h\ldots h+1}$ corresponds precisely to an hour.

Next, this cyclic temperature measurement and gradient formation are repeated for other time intervals, here days, for example, 3 days.

For each cycle, here a day, the time slots in which the temperature gradient is greater than or equal to 0 are stored in the described manner.

On the following day, here day 4, designated in FIG. 1 generally by a=x, it is determined whether there are congruent time slots in which the temperature gradient is greater than or equal to 0 for each day during the previous 3 days, in FIG. 1 generally designated as (x−1) days. Advantageously, such congruent time slots extend over at least 4 hours, generally designated as z hours in FIG. 1. If such time slots are found, then heating begins on day 4, generally on day a=x. If no such congruent time slots are found within this time interval, the analysis focusing on the past shifts by a day. In other words: The 24 stored temperature gradients for the first recorded day are deleted, and the search for another valid time slot is expanded to another day. The method begins anew after heating has occurred.

In sum, the method of the invention in the illustrated embodiment described here therefore proceeds from the following:

For a few days, here 3 days, the temperature gradient is determined for each hour and the time intervals of a positive temperature gradient or a temperature gradient that is precisely 0 are stored.

It is then determined whether there are congruent time slots for the individual days, i.e. whether for each of the covered days always at the same times, here over at least 4 hours, the temperature gradient has a value greater than or equal to 0. If this is the case, it is concluded that this case will also occur with the highest probability on the next day, so that at these points in time on the next day the criteria for heating will be met. If there are no corresponding time slots in the considered time interval, this method is continued for additional days.

Figure 2:
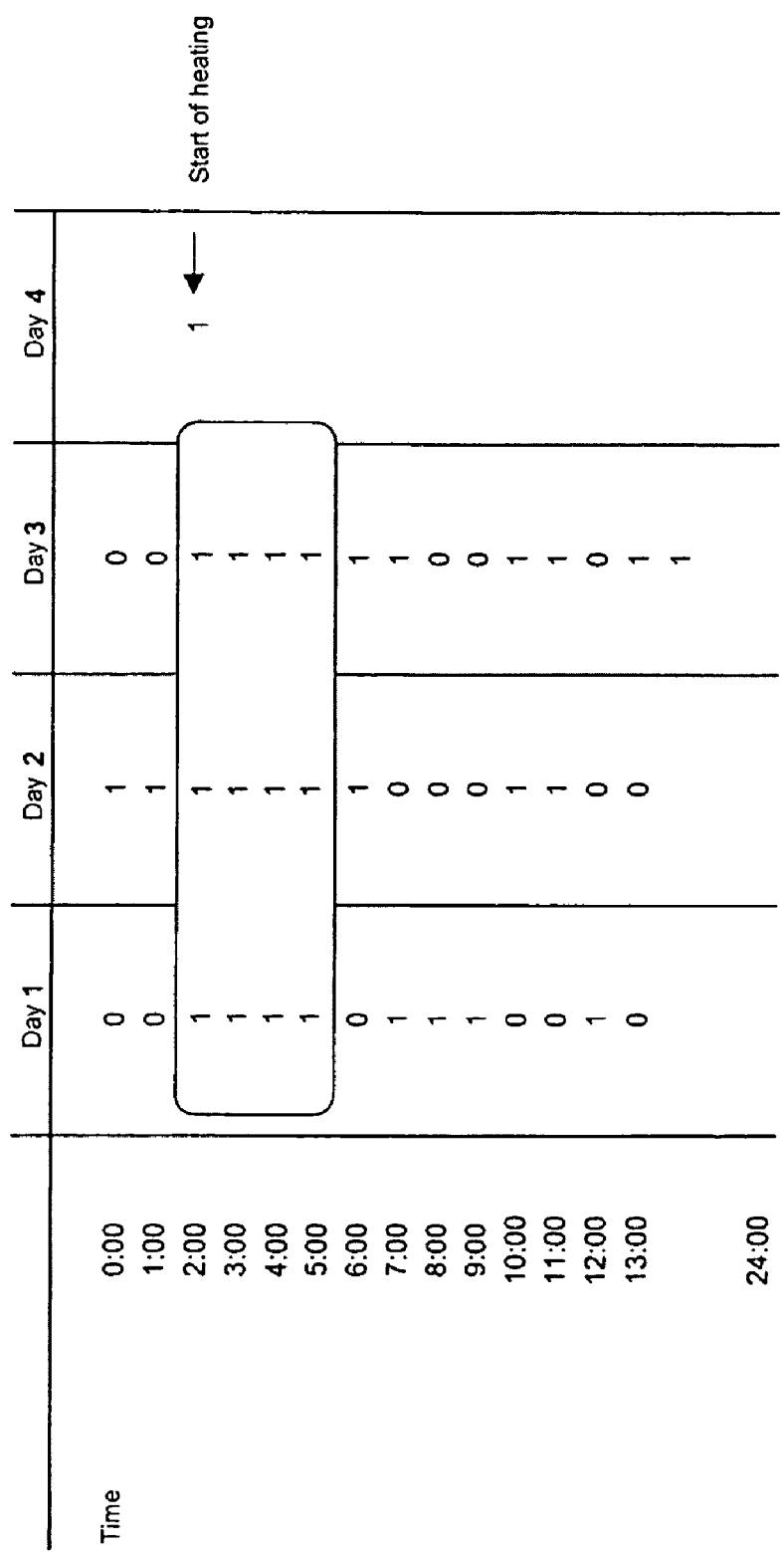
FIG. 2 shows a schematic tabular diagram of a data set within the scope of the method of the invention.

This is made clear once again in FIG. 2. A temperature gradient "1" is greater than or equal to 0, and "0" means a negative temperature gradient.

On day 1, the hourly temperature measurement and the subsequent gradient formation have produced a value of "1" in different time slots. This also occurs on subsequent days in other time slots. It is determined on the fourth day that for the three previous days there are corresponding time slots in the time ranges from 2:00 to 3:00 o'clock [a.m.], 3:00 to 4:00 o'clock, 4:00 to 5:00 o'clock, and 5:00 to 6:00 o'clock, thus four consecutive time slots. Accordingly, heating begins on the fourth day at 2:00 o'clock. The method can restart when the determined moisture value was exceeded or an pause time, which will still be discussed further hereinafter, has elapsed.

It must be noted that the described determination of 24 temperature gradients, i.e. 24 temperature differentials per day, is only one example. It is also possible within the scope of the invention to provide other intervals or time slots, particularly smaller increments, for the gradient formation. Likewise, the described necessary minimum duration of 4 hours for a temperature gradient greater than or equal to 0 can also be varied within the scope of the invention. Finally, within the scope of the invention, a value other than precisely a day can be selected for a cycle.

According to an advantageous aspect of the invention, in addition an operating time greater than the number of considered cycles, here x days, is provided, after which heating takes place in all cases and independent of gradient calculation. Guaranteed heating is achieved by this safety measure, also when in the extreme case no corresponding time slots can be found for a specified time interval due to unfavorable weather conditions, e.g. very high humidity or strong solar irradiation.

This method is suitable in an especially advantageous manner for providing condition-based heating in conjunction with the moisture sensor, known from the above-described related art, inside the air dehumidifier. In such a case, the moisture sensor sets a threshold value for the moisture at which the granules must be heated; the heating is then initiated by the method of the invention in the next valid time slot, characterized by a positive temperature gradient during a corresponding time slot of the previous time intervals.

The invention claimed is:

1. In a method of drying an air dehumidifier filled with moisture-absorbing material for oil-insulated transformers, chokes, or tap changers having an expansion tank wherein
   the air dehumidifier communicates with the expansion tank via an intake,
   the moisture-absorbing material can be heated by an electric heater and can thereby be dried and can regenerated, and
   actuation of the heater is only possible when no air flows into the interior of the expansion tank, the improvement comprising the steps of:
   dividing a primary cycle into different time slots,
   determining at the beginning of a first time and at a second time of each time slot in each case the temperature ($\theta_2 - \theta_1$) at the intake and calculating a temperature gradient (dθ/dt) therefrom according to the relation $\theta_2 - \theta_1 = d\theta/dt$,
   subsequently repeating these temperature measurements and calculations of temperature gradients for identical time slots in x−1 successive primary cycles,
   storing for each of the primary cycles those time slots in which the temperature gradient is greater than or equal to 0,
   thereafter determining during another cycle x whether during each of the previous cycles there are at least z consecutive identical stored time slots during which the temperature gradient is greater than or equal to 0, and if this is the case, during cycle x at the beginning of the corresponding time slots of the previous cycles starting the electric heater, provided that at this time the temperature gradient is again greater than or equal to 0, or, if this is not the case, including another cycle x+1 in the comparison.

2. The method according to claim 1 wherein in each case an entire day comprising 24 hours is selected as the primary cycle.

3. The method according to claim 1 wherein the value for x is 4 after storage of all time slots for three cycles, the calculation for related identical time slots occurring in the subsequent fourth cycle.

4. The method according to claim 1 wherein the value for z is 4.

5. The method according to claim 1 wherein the heater is started only when in addition a moisture sensor signals that a moisture threshold value in the area of the air dehumidifier is exceeded.

6. The method according to claim 1 wherein in addition an operating time greater than the number x of the considered cycles is provided after which heating takes place in all cases and independent of the temperature gradient evaluation and moisture measurement.

* * * * *